United States Patent [19]

Shirouzu et al.

[11] 4,168,630

[45] Sep. 25, 1979

[54] SEMICONDUCTOR PRESSURE CONVERTER

[75] Inventors: Shunji Shirouzu, Ayase; Susumu Kimijima, Tokyo; Syozo Sato, Sagamihara, all of Japan

[73] Assignee: Tokyo Shibaura Electric Co., Ltd., Kawasaki, Japan

[21] Appl. No.: 853,869

[22] Filed: Nov. 22, 1977

[30] Foreign Application Priority Data

Nov. 24, 1976 [JP] Japan ................ 51-140218

[51] Int. Cl.² ............................................. G01L 9/06
[52] U.S. Cl. ........................................ 73/727; 338/4; 338/42
[58] Field of Search ............... 73/721, 727, 754, 756; 338/4, 42

[56] References Cited

FOREIGN PATENT DOCUMENTS 1248087 9/1971 United Kingdom ............... 73/727
1278210 6/1972 United Kingdom ............... 73/727

OTHER PUBLICATIONS

IEEE Transactions on Electron Devices, vol. ED-16, No. 10, Oct. 1969, p. 870, E. R. Peake et al.

Primary Examiner—Donald O. Woodiel
Attorney, Agent, or Firm—Oblon, Fisher, Spivak, McClelland & Maier

[57] ABSTRACT

A semiconductor pressure converter includes a silicon pressure sensing element, a silicon base hermetically attached to the sensing element to bear the element and a metal pipe connected to the silicon base so as to introduce a pressure to the sensing element through the silicon base.

4 Claims, 2 Drawing Figures

1

SEMICONDUCTOR PRESSURE CONVERTER

BACKGROUND OF THE INVENTION

This invention relates to pressure transducers for converting variations in pressure into electric signals, more specifically to semiconductor pressure converters with a silicon substrate.

These converters are so constructed that resistance regions, diode regions or transistor regions are formed in a silicon substrate and variations in the pressure applied to the substrate may be picked out as electric signals by taking advantage of the piezoelectric phenomenon or junction stress effect. In the silicon substrate used the central portion is thinned to form a diaphragm portion for facilitating distortion under a relatively low pressure, on which a subject fluid is to act. In the prior art devices a metal support with a fluid passage formed through the center thereof is used as a means for introducing the fluid into the diaphragm portion as well as for supporting the silicon substrate. For such support there is selected a metal with the coefficient of thermal expansion approximate to that of silicon so as to avoid distortion of the substrate by the difference in the coefficient of thermal expansion between the support and the silicon substrate. At present most preferred is INL Metal (trade mark, from Tokyo Shibaura) mainly composed of nickel and iron. This type of metal, however, may approximate its coefficient of thermal expansion to that of silicon only within a temperature range of about $-40°$ C. to $100°$ C., so that the application fields for the pressure converters with such support have been limited. In order to avoid the effect of thermal distortion of the package to contain the support, a constricted portion is formed in the support in the vicinity of the portion connected to the package. However, this constricted portion alone could not fully prevent such effect, failing to ensure high-accuracy devices.

SUMMARY OF THE INVENTION

Accordingly, an object of this invention is to provide semiconductor pressure converters free from restrictions on the working temperature and capable of securely preventing the effect of thermal distortion of package due to the external temperature, thereby ensuring high-accuracy measurement of pressure.

DETAILED DESCRIPTION OF THE PREFERRED EMBODIMENT

Now I will describe in detail the semiconductor pressure transducer or converter according to an embodiment of this invention with reference to the accompanying drawing.

Figure 1:
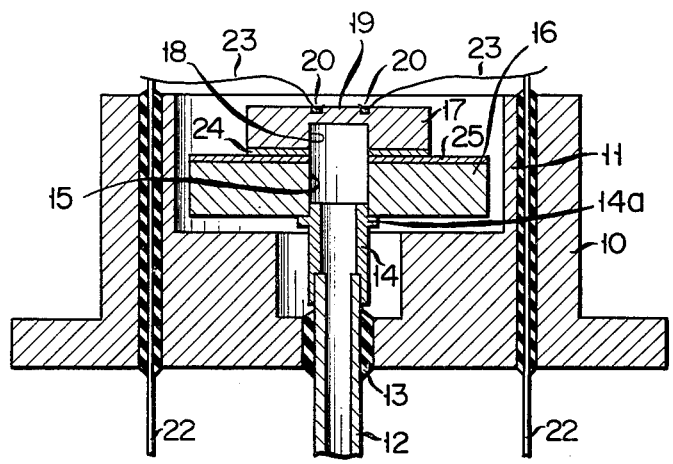
FIG. 1 is a sectional view of the semiconductor pressure converter according to an embodiment of this invention.

In FIG. 1 numeral 10 denotes an iron package in top of which a recess 11 to contain a sensing element is formed. A pressure introducing pipe 12 hermetically sealed by a glass 13 through a hole bored through the recess 11 at the central portion of the bottom wall of the package 10, the top end of the pipe 12 extending into the recess 11. The top end of the pressure introducing pipe 12 is hermetically fitted in the bottom end of a coupling pipe or connecting pipe 14 made of metal, while the top end of the pipe 14 is connected to a silicon base 16 with a hole 15 bored through the center thereof. At the upper end portion of the pipe 14 is formed a flange 14a. With the top end of the pipe 14 fitted in the hole 15 and with the flange 14a pressed against the bottom face of the silicon base 16, the silicon base 16 is borne by the connecting pipe 14. Between the silicon base 16 and pipe 14 is interposed a suitable adhesive, such as Au-Si eutectic alloy, for hermetically sealing the hole 15 with the pipe 14. A silicon pressure sensing element 17 is attached to the top face of the silicon base 16. This element 17 is constructed by a silicon substrate having a diaphragm portion 19 with a thinned central portion formed by boring a recess 18 in the central portion of the bottom face of a silicon substrate with a level top face. In the top face of the diaphragm portion 19 are formed impurity diffusion layers 20 of a conductivity type opposite to that of the substrate. Since there is used an n-type substrate in this embodiment, the diffusion layers or resistance layers 20, four in number, are of a p-type and arranged radially around the center of the substrate at regular intervals. Each layer 20 is electrically connected with the package 10 through each of lead wires 22 passing through the package while insulated therefrom by means of each of glasses as well as through each of bonding wires 23. Consequently, when the diaphragm portion 19 is distorted by the fluid pressure, the diffusion resistance layers 20 are subjected to an electrical change corresponding to the degree of such distortion, which is picked out by means of the lead wires 22 through the bonding wires 23.

The recess 18 of the semiconductor substrate and the recess 15 of the silicon base 16 are aligned with each other and hermetically sealed as follows.

A nickel layer 25 with a thickness of 50 A to 200 $\mu$m is preformed over the top face of the silicon base 16 by evaporation or plating. Subsequently, between the thick peripheral portion of the silicon substrate 17 and the nickel layer 25 is interposed a gold foil 24 with a thickness of approximately 10 to 50 $\mu$m having the same shape with the bottom face of the silicon substrate 17, i.e., having an opening formed therein correspondingly to the recess 18. Thereafter, the integrated body is subjected to a load of 100 to 500 g/cm² and heated to a temperature of 360° C. to 400° C. in H₂-reducing atmosphere or inert gas atmosphere, such as Ar and N₂, and the bottom face of the silicon substrate 17 and the nickel layer 25 are connected and hermetically sealed by means of the Au-Si eutectic alloy layer 24.

In the converter of this embodiment, the pipe 12 for introducing the fluid whose variations in pressure are to be measured, as well as the coupling pipe 14, is cylindrically shaped, so that both the hole 15 of the silicon base 16 and the recess 18 of the silicon substrate, which are connected with these pipes, have a cylindrical section. The coupling pipe 14 may preferably be formed of a material with the coefficient of thermal expansion approximate to that of silicon, such as INL, and the pipe 12 may share its material with the pipe 14, though there is required not so much consideration with respect to such material as compared with the case of the coupling pipe 14. While the hermetical bonding of the pressure introducing pipe 12 with the coupling pipe 14, as well as the pipe 14 with the silicon base 16, may be done by using the Au-Si eutectic alloy, the conventional bonding method, such as use of epoxy resins, Au-Sn eutectic alloy, solder, etc., may be also available.

While in the above embodiment the silicon base and silicon substrate are hermetically sealed by means of the Au-Si eutectic alloy, an Au-Si eutectic alloy with high hermetical-sealing capability and adhesive strength may be obtained by forming in bonding a gold layer on a nickel film or a layer of a metal other than gold, such as copper and chromium, and then heating these layers to form an Au-Si eutectic alloy between the gold layer and silicon substrate, owing to the better wetting (property) of the Au-Si eutectic alloy as compared with the metal layer.

Figure 2:
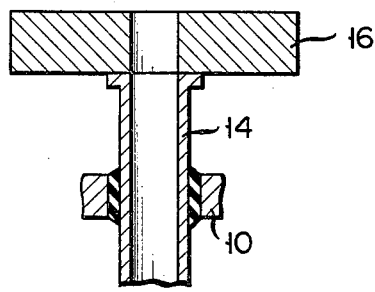
FIG. 2 is a sectional view of the support used with the converter of FIG. 1 showing an alternative embodiment.

Although in the aforementioned embodiment the pressure introducing pipe 12 and coupling pipe 14 are separately formed and then connected with each other, the use of the pressure introducing pipe may be omitted by lengthening the coupling pipe 14 and hermetically sealing the pipe 14 with the package 10 as shown in FIG. 2. In this case the construction may be simplified and the effect of thermal distortion from the package may be reduced by using INL or other material with the coefficient of thermal expansion approximate to that of silicon.

In the semiconductor pressure converter of the invention as described above, the silicon substrate or silicon sensing element is borne by the silicon base, so that the distortioning effect of the heat produced in bonding thereof or the external heat after completion may substantially be absorbed by the silicon substrate. Further, the silicon substrate is supported by the metallic connecting pipe with a substantially smaller outside diameter as compared with that of the substrate, so that the effect of the distortion of the package due to the ambient heat on the silicon substrate may more securely be prevented.

What we claim is:

1. A semiconductor pressure converter comprising a silicon sensing element having a thinned diaphragm portion disposed at the central portion, a thick peripheral portion and at least one pressure sensing region formed on one side of said diaphragm portion; a silicon base with one side hermetically attached to one side of said peripheral portion of said sensing element to bear said sensing element; a metal package for housing the sensing element and silicon base; a connecting pipe with one end attached to the other side of said silicon base to bear said base, a pressure introducing pipe penetrating through the metal package and having one end connected to the other end of the connecting pipe, a hermetical seal for electrically insulating the pressure introducing pipe from the metal package and attaching the pressure introducing pipe to the metal package, said connecting pipe and pressure introducing pipe having a smaller outside diameter as compared with said silicon base; and a pressure passage means formed through said silicon base for introducing a pressure from said metal pipe into said diaphragm portion.

2. A semiconductor pressure converter according to claim 1, wherein said silicon sensing element has a recess formed on one side thereof, which is opposite to one bearing said sensing region, to define said diaphragm portion, and said pressure passage means is a hole with one end opening into said recess and the other end connected to said metal pipe, extending through said silicon base.

3. A semiconductor pressure converter according to claim 2, wherein an Au-Si eutectic alloy layer is formed between said peripheral portion of the silicon sensing element and said silicon base, thereby attaching said silicon sensing element to said silicon base.

4. A semiconductor pressure converter according to claim 3, wherein a metal layer is interposed between said Au-Si eutectic alloy layer and silicon base.

* * * * *